(12) United States Patent
Nylander et al.

(10) Patent No.: US 6,973,644 B2
(45) Date of Patent: Dec. 6, 2005

(54) PROGRAM INTERPRETER

(75) Inventors: Charles G. Nylander, Merrimack, NH (US); William M. McKeeman, Hollis, NH (US); Brett Baker, Framingham, MA (US); William Nell, Marlborough, MA (US)

(73) Assignee: The MathWorks, Inc., Natick, MA (US)

( * ) Notice: Subject to any disclaimer, the term of this patent is extended or adjusted under 35 U.S.C. 154(b) by 566 days.

(21) Appl. No.: 10/121,743

(22) Filed: Apr. 12, 2002

(65) Prior Publication Data

US 2003/0196196 A1    Oct. 16, 2003

(51) Int. Cl.[7] ............................................... C06F 9/45
(52) U.S. Cl. ...................... 717/139; 717/136; 717/137; 717/140; 717/148; 717/111
(58) Field of Search ..................... 717/108, 114, 130, 717/136–137, 139–140, 148, 151, 153, 118, 717/131, 147

(56) References Cited

U.S. PATENT DOCUMENTS

| | | | | |
|---|---|---|---|---|
| 5,848,274 A * | 12/1998 | Hamby et al. | ............... | 717/153 |
| 5,860,008 A * | 1/1999 | Bradley | ....................... | 717/137 |
| 5,903,761 A * | 5/1999 | Tyma | ........................... | 717/148 |
| 5,933,635 A * | 8/1999 | Holzle et al. | ................ | 717/151 |
| 6,118,940 A * | 9/2000 | Alexander, III et al. | ..... | 717/127 |
| 6,237,141 B1 * | 5/2001 | Holzle et al. | ................ | 717/153 |
| 6,275,985 B1 * | 8/2001 | Ungar et al. | ................. | 717/148 |
| 6,327,702 B1 * | 12/2001 | Sauntry et al. | .............. | 717/118 |
| 6,336,213 B1 * | 1/2002 | Beadle et al. | ................ | 717/136 |
| 6,643,842 B2 * | 11/2003 | Angel et al. | ................. | 717/130 |
| 6,647,547 B1 * | 11/2003 | Kanamaru et al. | ........... | 717/151 |
| 6,694,507 B2 * | 2/2004 | Arnold et al. | ............... | 717/108 |
| 6,826,749 B2 * | 11/2004 | Patel et al. | .................. | 717/148 |
| 6,832,369 B1 * | 12/2004 | Kryka et al. | ................. | 717/140 |
| 6,857,118 B2 * | 2/2005 | Karr et al. | ................... | 717/114 |
| 6,865,734 B2 * | 3/2005 | Holzle | ......................... | 717/153 |

OTHER PUBLICATIONS

TITLE: Partial method compilation using dynamic profile information, author: Whaley, ACM, 2001.*
TITLE: Compiling Standard ML to Java Byte codes, author: Benton et al, ACM, 1998.*
TITLE: Performance Measurement of Dynamically Compiled Java Excut ions, author: Newhall et al, ACM, 1999.*
TITLE: Fast, effective code generation in a Just-in-time Java Compiler, author: Adi-Tabatabai et al, ACM, 998.*
TITLE: A Type System for Java Bytecode Subroutine, author: Stata et al, ACM, 1998.*

* cited by examiner

*Primary Examiner*—Chameli C. Das
(74) *Attorney, Agent, or Firm*—Lahive & Cockfield, LLP

(57) ABSTRACT

A method and system is provided that allows a well-behaved program to execute more quickly than dynamically typed programming languages did in the past, thereby allowing a the dynamically typed language to be competitive with static declarative programming languages. A method includes converting lines of source code representing functions to byte-codes representing functions, selecting a subsequence of the byte-codes based on the byte-codes and the dynamic run-time properties of program variables, generating processor instructions in a compiler for the subsequence, and interpreting the byte-codes not contained in the subsequence.

25 Claims, 2 Drawing Sheets

PROGRAM INTERPRETER

TECHNICAL FIELD

This invention relates to an improved program interpreter.

BACKGROUND

High-level programming languages typically process English-like programming statements in one of two ways. The first way is known as compilation. Compilers perform a translation of the high-level language into machine language before the program is run. The result of this process is a file of machine code that is directly executable by the machine.

A second way is known as interpretation. Interpreted software languages are not translated into a form that is directly readable by the computer but are, instead, processed as data by an interpreter.

Compiled languages are usually faster than interpreted languages, because an interpreter or a virtual machine must typically process each high-level program statement each time it is executed, while a compiler need only translate each program statement once, after which the computer may execute the resulting code directly. Interpreted languages, however, are often easier to use and more powerful than compiled languages and so are often used to write smaller programs in which speed of program execution is not as important as speed and ease of writing the program.

In any programming language, whether compiled or interpreted, a variable's type denotes what kind of values it contains. Example variable types are integer, floating point, and text string. When a variable is static, it means the type is fixed or bound at compile time, and cannot thereafter be changed. When a variable is dynamic, it means that the type is not fixed or bound until run time, and therefore can change repeatedly during the course of program execution. Thus, dynamic typing refers to the property that a variable can adopt a type and change that type according to run-time demands.

In programming, static typing often allows better error detection, more work at compile time and hence faster execution times, while dynamic typing often allows greater flexibility, and easier to write (for example, no declaration statements) programs.

SUMMARY

In an aspect, the invention features a method including converting lines of source code representing functions to byte-codes representing functions, selecting a subsequence of the byte-codes based on the byte-codes and the dynamic run-time properties of program variables, generating processor instructions in a compiler for the subsequence, and interpreting the byte-codes not contained in the subsequence.

Embodiments may include one or more of the following. The properties may include at least one of variable type or variable shape. Selecting may include analyzing the type and shape of the variables referenced by the byte-codes, and determining whether at least one of the type or shape is modified. Selecting may also include adding the byte-codes to the subsequence if the type and shape is not modified. The subsequence may represent a compilation unit.

The method may also include executing the processor instructions in a processor. The method may include reverting a compilation unit to interpreted byte-codes, and removing the byte-codes in the subsequence of lines in which the type or shape of variables has changed. The method may include reverting a compilation unit to interpreted byte-codes, and determining whether the byte-codes that are members of the subsequence can remain in the subsequence. Determining may include analyzing the original type and shape of a variable, and determining whether a new type and a new shape of variable can be represented by the original type and original shape of variable. Determining may include analyzing the original type and shape of a variable, and determining whether the byte-codes can be compiled to processor instructions that can process both the original type and shape of the variable and the modified type and shape of the variable.

In another aspect, the invention features a method including converting lines of source code representing functions to byte-codes representing functions, selecting a subsequence of the byte-codes based on the byte-codes and the dynamic run-time properties of program variables, generating alternate byte-codes in an accelerated interpreter for the subsequence, and interpreting the byte-codes not contained in the subsequence.

Embodiments may include one or more of the following. Selecting may include determining the type and shape of variables referenced by the byte-codes, and resolving dynamic variable and constant value references to an absolute memory address. Resolving may include determining whether an expression requires one or more temporary results, and storing the temporary results in memory locations that are determined at compile time. Resolving may include using a composition of an expression to group operations of an element-wise expression into a single compound operation.

In another aspect, the invention features a method including converting source code representing functions to byte-codes representing functions, selecting a first subsequence of the byte-codes based on the byte-codes and the dynamic run-time state of program variables, selecting a second subsequence of the byte-codes based on the byte-codes and the dynamic run-time state of program variables, generating processor instructions in a compiler for the first subsequence, generating alternate byte-codes in an accelerated interpreter for the second subsequence, and interpreting the byte-codes not contained in the first subsequence and the second subsequence.

Embodiments may include one or more of the following. Selecting the first subsequence may include analyzing the type and shape of the variables referenced by the byte-codes, determining whether the type and shape is modified, and adding the byte-codes to the subsequence if the type and shape is not modified. Selecting the second subsequence may include determining the type and shape of variables referenced by the byte-codes, and resolving dynamic variable and constant value references to an absolute memory address. Selecting the second subsequence may include using a structure of an expression to group operations of an element-wise expression into a single compound operation.

In another aspect, the invention features a system including a first interpreter in a memory for converting source code into bytes-codes representing functions, an analysis unit in the memory for analyzing whether the byte-codes can be stored in a subsequence of byte-codes, a compiler for compiling byte-codes in the subsequence to processor instructions, and a second compiler for converting byte-codes not resident in the subsequence to alternate byte-codes.

In embodiments, the system may include a second interpreter for executing the alternate byte-codes and a processor for executing the processor instructions. The system may include an input/output device for receiving the source code and displaying results after execution of the processor instructions.

Embodiments of the invention may have one or more of the following advantages.

The process dynamically discovers the regions of a function whose execution, by techniques not used in traditional interpreters, can be significantly speeded up. The process does this using both the code of the program and the dynamic properties of variables that cannot be determined before the code is actually executed. The process compiles the byte-codes for these regions at the time of first execution (not in advance) such that the resulting generated processor instructions and/or alternate byte-codes code matches the actual properties of the variables at that point in program execution. Regions that are compiled to reflect the properties of the program variables in that region may be as small as one statement of M-code; these potentially small program units are the "fine grained" in fine grained compilation. If the program subsequently changes the properties of variables such that the generated processor instructions and/or alternate byte-codes for a region are no longer valid, the program continues to execute correctly by adapting to the change. This adapting may be via "permissive" execution, wherein the new properties of a variable can be represented in terms of the old properties of the variables; via dynamic recompilation for "generalization," wherein the old properties of the variable can be represented in terms of the new properties of the variable; or via reversion to the conventional interpreter for that region. When a region that has been compiled into processor instructions and/or alternate byte-codes is going to be executed, the variables referenced by the processor instructions and/or alternate byte-codes in the region are copied from the interpreter workspace to the accelerated workspace. "Safe variables" whose properties are entirely defined within a region do not have to be checked or copied. At the end of such a region, variables modified by the region are copied from the accelerated workspace back to the interpreter workspace.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
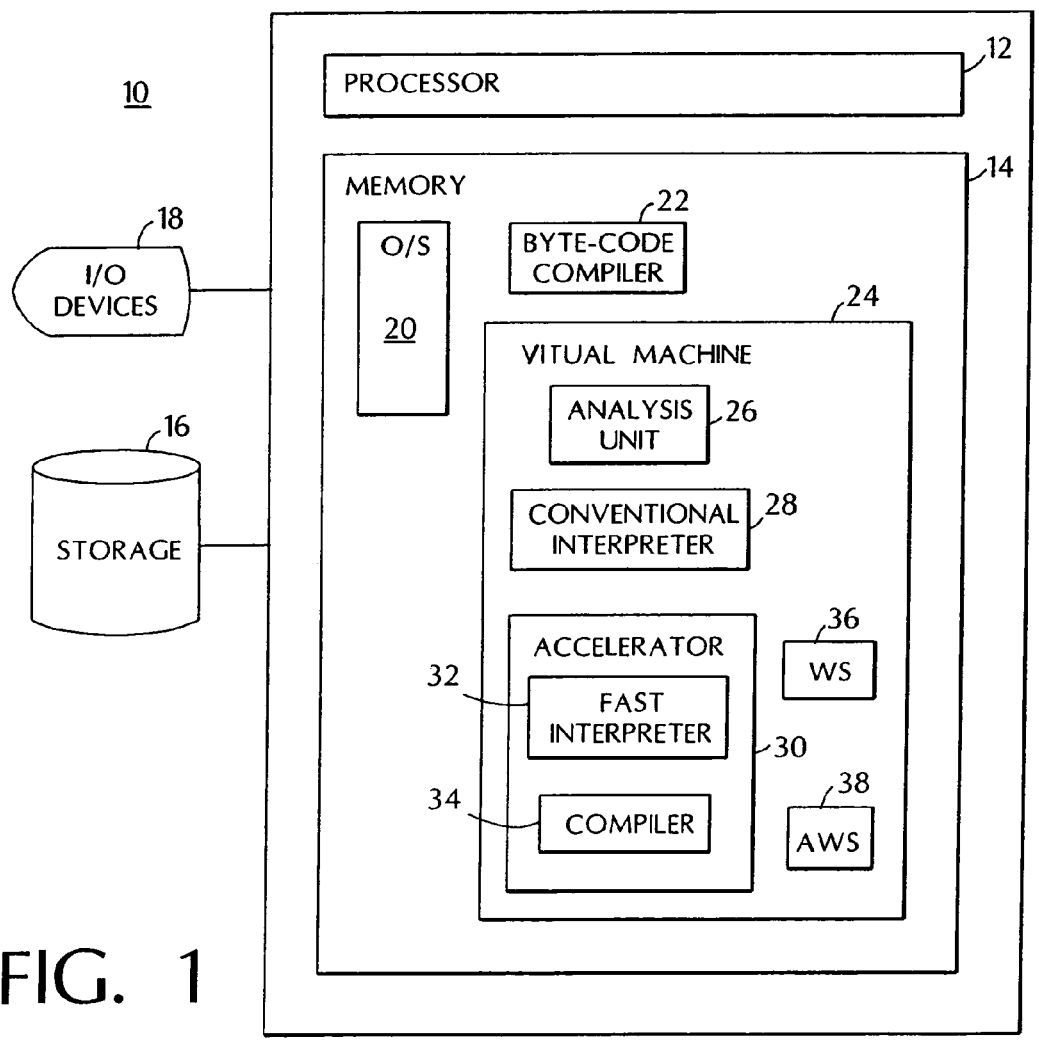
FIG. 1 is a block diagram of a system.

Referring to FIG. 1, a system 10 includes a processor 12, a memory 14, a storage 16 and an input/output (I/O) device 18. The processor 12 is directed by sequences of instructions in memory 14 called native code. The system 10 is enabled by an operating system (OS) 20 and other software components in memory 14, typically expressed in native code and reloaded into the system 10 for the convenience of its users.

The memory 14 also includes a byte-code compiler (BCC) 22 and a virtual machine (VM) 24. The VM 24 includes an analysis unit (AU) 26, a conventional interpreter (CI) 28, and an accelerator 30. The accelerator 30 includes a fast interpreter (FI) 32 and a compiler 34. The FI 32 typically operates on any supported processor. The compiler 34 is typically implemented differently for each specific processor and may not be implemented at all for some processors. If the compiler 34 is implemented, it is said to be supported.

System 10 may be used in conjunction with a programming language. The MATLAB language M, from the MathWorks Inc. of Natick Mass., is an example programming language, incorporated herein by reference. All references to M are to be taken as references to the class of languages of which M is an example.

The language M contains conventional constructs such as assignments and control statements as well as a variety of data types such as double and complex and a variety of data shapes such as scalars and matrices. Such programs typically are presented to the system 10 in larger units called functions or scripts. For the purposes of this description the term function refers to both function and script. An M function may have zero, one, or several compilation units associated with it. Not all lines and statements of M code in the function necessarily have such compilation units associated with them; there may be one or more sections of a function that are not a part of any compilation unit.

The M language is an example of a dynamically typed programming language (DTPL). In such a language the variables can change value, type and shape with every assignment during program execution. This is contrasted to statically typed programming languages (STPL) such as C and FORTRAN, where only the value of a variable can be changed after the program begins execution. A DTPL is convenient for the programmer but must provide means to continually examine and react to changes type and shape during execution. In an STPL the type and shape are fixed, making efficient implementations easier to provide.

The system 10 enables DTPL programs, such as those written in M, to run faster and, in fact, as fast or faster than those written in an STPL. The system 10 does not change the behavior of M programs beyond performance parameters.

Another set of properties common to DTPL and STPL have to do with system integrity. If a user program causes damage to the system 10 (typically by accessing beyond the bounds of memory 14 allocated to the program), unpredictable results can be obtained. A language may be designed so that all sources of integrity violation are checked during execution, thereby insuring reliability. Typically, checking is not provided in a STPL because the users of a STPL prefer faster unchecked code whereas users of a DTPL accept the additional cost of checking because it is less significant relative to the inefficient implementation for the DTPL. In one aspect, the system 10 reduces the cost of insuring system integrity so that both integrity and efficiency are provided simultaneously.

The byte-code compiler 22 examines M functions and either rejects them with conventional diagnostics to help the user correct errors, or translates the M, now known to be acceptably correct, into byte-codes that are the input to the virtual machine 24. Prior to the invention of system 10, the VM 24 applied the conventional interpreter 28 to the byte-codes and carried out the instructions implied by the original M program.

A variable store associated with each function by the CI 28 is called a workspace (WS) 36. Values in the WS 36 are used and modified by the CI 28. Intermediate and final values in the WS 36 contain a desired result of the user's computation as expressed in M. Utilizing system 10, two alternative execution methods are used to increase the speed of overall execution.

Not all of the byte-codes and not all values in the WS 36 can be efficiently dealt with by the accelerator 30. In those situations the computation falls back onto the CI 28, at neither a loss nor gain in execution speed compared to conventional interpretation.

For any given M function, the selection of the portions of the byte-codes that can be dealt with by the accelerator 30 is carried out initially by a first analysis unit 26 function which delimits the longest candidate subsequences (CS) that pass a set of preliminary tests. The first analysis unit 26 function allows the system 10 to exploit an assumption that certain properties of variables, i.e., type and shape, are known and unchanging at every point during execution of a compilation unit. Thus, it is acceptable to compile a subset of M operations and data types that can be speeded up by using the compiler 34 rather than the conventional interpreter 28. A compilation unit is not necessarily an entire function. Rather, the compiler 34 has the ability to compile one or more selected sections as individual compilation units.

These preliminary tests include whether the CS meets criteria for being aligned with line structure of the original M code; no branching logic carries execution into, or out of the CS; no unacceptable constant or function is referenced in the CS; and no features which cannot be accelerated are found in the CS. These CS preliminary tests are tabulated within the VM 24.

Each CS is then examined by a second AU 26 function, e.g., VARFLOW, which tabulates the usage pattern of every variable used in the CS. Some such variables, called SAFE variables, are in fact assigned prior to any use on every execution path in the CS. The VM 24 then examines the current type, shape and value of each used variable in the WS 36. If a variable that is not SAFE has a current type, shape or value that is not acceptable to the accelerator 30 because it conflicts with the rules that were used to select the subsequence of byte-codes, the variable is added to an exclude list. If the exclude list is not empty, the second AU 26 function VARFLOW is called once again, and shortens the CS to avoid all references to variables on the exclude list. If the result is to shorten the CS to length 0, the CS is abandoned and execution thereafter falls back to the CI 28.

Once the AU 26 function VARFLOW has reported the information it has gathered, the VM 24 builds a symbol table (not shown) in memory 14 that records the most general version of type and shape for each variable in the CS. For SAFE values a special value, i.e., TBD, signifying to-be-determined, is recorded in the symbol table. The VM 24 also builds an accelerated workspace (AWS) 38 and populates it with selected values from the WS 36, in what we refer to as marshaling-in.

We describe three examples. First, the variable is SAFE in which case the WS 36 value is ignored and a special value, i.e., NEVER_TOUCHED, that cannot otherwise occur is placed in the AWS 38. Second, the variable is a not-SAFE scalar in which case its value is copied from the WS 36 to the AWS 38. Third, the variable is not a scalar, in which case descriptive information is placed in the AWS 38, but the values themselves are left in the WS 36. Note that the CS for a DTPL depends on the most current actual execution-time information about variables is used, in contrast to an STPL where such information must be gathered prior to execution. Also note that the collection of frequently used values into the AWS 38 has the effect of efficient use of various levels of memory cache (not shown).

A third AU 26 function, i.e., TYPEFLOW, may further analyze the byte-codes in the light of the information in the symbol table. A task of the TYPEFLOW function is to insure that the type and shape of each intermediate result is consistent with the rules of the subsequence of byte-codes that can be compiled or can be executed by the FI. A component of the TYPEFLOW function is a table of built-in function signatures that predicts the type and shape of the result of each function based on the type and shape of its arguments. If a conflict is found between the type or shape of a result and the rules that apply to the subsequence of byte-codes, the CS is shortened once again to exclude the region that contains the conflict. If the result is to shorten the CS to length 0, the CS is abandoned and execution thereafter falls back to the CI 28.

If an assignment to a TBD variable is encountered, the symbol table is updated with the now known type and shape of the variable. In circumstances where the type/shape of a result is not definite (for example, in M a variable may be scalar or an empty array depending on the arguments to a built-in function), a notation is made so that later processing can take the ambiguity into account and insert checks into the execution sequence to exactly copy the behavior of the CI 28. If a TBD type/shape is encountered in a context where the type and shape are needed, dead code has been detected and can be diagnosed as a user programming error. At this point the CS has the properties of a STPL in that it can be compiled with full knowledge of the type of every operand, thus achieving execution efficiencies comparable to those found for a STPL.

While the TYPEFLOW function is carrying out its principal task, it is also examining the values that expressions can assume on any execution path preparatory to optimizing the resulting executable. For example, if it can be shown that the value on all paths to some expression of type double used as an array index are integral (0, 1, 2, 3 . . . ), then no execution-time check need be placed in the subscripting code to insure that expression is integral as required by the M language. If additionally, a value can be shown to be positive, another check to insure that it does not violate the lower bound of an array can be avoided.

Similar comments apply to checks required to avoid division by zero and square root of negative numbers, checks required to avoid trigametric functions that return complex results, copying of shared data structures, and other limitations required to match the required behavior of the M language. A component of this is a set of tables predicting the range of values (negative, zero or positive, or NZP) based on the same information for the arguments, for commonly called functions. For example, "N+N=N" indicates that two negative numbers give a negative sum. NZP analysis (in contrast to range arithmetic) is chosen because the NZP ranges are stable for code with loops.

The accelerator 30 is presented the information collected by the VM 24, including the byte-codes, symbol table and AWS 38. The compiler 34 is similar to compilers for any STPL and produces similarly efficient results. The compiler 34 uses the byte-codes as an intermediate language (input) and the native machine code as target (output). If the compiler 34 is supported, the accelerator 30 calls the compiler 34 as the most efficient execution mechanism. The compiler 34 attempts to convert the binary-codes into native machine code for the system 10. If the compiler 34 finds something it cannot compile, the compiler optionally backs up to an earlier point, reports the length of byte-codes it did not compile and the native machine code, referred to as HOTCODE, corresponding to that byte-code. If any HOTCODE was generated, the accelerator 30 causes the HOTCODE to be executed and once again calls the compiler 34 on the remainder of the byte-code. If the compiler 34 is not supported or if no HOTCODE was generated, the accelerator 30 calls the fast interpreter (FI) 32 on the same CS.

The FI 32 attempts to compile the remaining byte-codes, but into what we refer to as alternate byte-codes (ABC) rather than native machine code. If FI 32 encounters something it cannot compile, the FI 32 backs up to the last good point, executes what ABC it can, shortens the byte-code and falls back on the conventional interpreter 28 for the remainder of the CS execution.

During FI 32 execution the type of all variables is known, but the shape may not be. In contrast to the CI 28 that uses zero-address code, the FI 32 uses three-address code. The purpose is to reduce the overhead of manipulating a run-time stack as required by CI 28 by using a code wherein the origin and destination of operands and results is known. The FI 32 makes a third byte-code (EE) to correctly reflect the element-by-element behavior required by the M language. The EE is used and immediately discarded during the interpretation of the ABC.

The FI 32 is faster than the CI 28 because the CI 28 must determine the type at every computation in contrast the ABC which operates on known types. The overhead of the FI 32 is amortized over many operations when its operands are large (for example type complex or shape array).

The accelerator 30 is able to efficiently process element-wise array expressions. (One or more of the values in an element-wise expression may be scalar, in which case the scalar value is treated as an array which has the same size as the other arrays in the expression, and in which each element has a single value. This is referred to as "scalar expansion".) When compiling an element-wise expression, the accelerator uses the composition of the expression to group the operations of an element-wise expression into a single compound operation. By treating an element-wise expression as a single operation, the accelerator 30 is able to optimize the execution of the expression by preventing the generation of (potentially large) temporary arrays. Since the size and shape of each array is not known when the accelerator 30 compiler is generating alternate byte-codes, there is a secondary compilation that occurs dynamically at the time the alternate byte-codes are executed by the accelerator fast interpreter 32. During this the compound operation is compiled into specific accelerator alternate byte-code based on the size, shape, and actual memory addresses of the arrays. If, during this dynamic secondary compilation, any operations are discovered to be applied to scalars that would be subject to scalar expansion, these values are calculated during this compilation, to avoid recalculation of these values for every element of the element-wise expression.

Additionally, there are several functions in MATLAB that generate arrays that are filled with a single value. In the accelerator 30, these are treated as scalars in element-wise expressions, and are not expanded until necessary, thereby eliminating redundant computations. These techniques enable the accelerator 30 to execute element-wise expressions very fast.

All HOTCODE and ABC are saved so that upon subsequent executions (for instance, inside of a loop) they can be reused. The conditions, particularly the type and shape of variables, under which the HOTCODE and ABC were prepared must be checked once again before reuse. The marshal-in process is therefore repeated to determine whether the necessary conditions are met. The shape and type of the variables presented do not have to match exactly the expected shape and type, if the presented shape and type can be represented as the expected shape and type. A scalar can, for example, be represented as a 1×1 matrix, and so a scalar meets the necessary conditions when a matrix is expected; a real double can be represented as a complex double with a zero imaginary part, so a real double meets the necessary conditions when a complex double is expected. We refer to this as permissive marshaling.

If the conditions are not met the accelerator 30 has several alternatives. The simplest is to fall back on the CI 28 for this particular execution, on the assumption that the conditions might be met at a later time.

A second alternative is to generalize the entries in the symbol table to reflect the original and new conditions and call the accelerator 30 again. We refer to this as dynamic recompilation. Because only more general conditions are used (for example, a scalar can be considered a 1×1 matrix), this dynamic recompilation converges to a final general form of HOTCODE and/or ABC.

A third alternative is to make and save additional forms of the HOTCODE and/or ABC (called a CLONE) so that more than one set of conditions can be processed. In this case the marshal-in information is used to select a previous CLONE, or cause a new one to be created. Typically, practical concerns such as memory limitations cause accelerator 30 to limit the number of forms it can save. Either a new CLONE must be rejected or it must replace an existing CLONE that is then discarded. The third alternative is particularly useful in circumstances analogous to overloading in the C++ language. A fourth alternative is to discard the invalid HOTCODE and/or ABC, and generate new HOTCODE and/or ABC that exactly matches the new properties of variables in that region. The new code will work correctly with the changed properties of the variables used in that region.

As described above, at the time that the HOTCODE and/or ABC is compiled, the analysis process 26 records important properties (specifically, the type and shape) of all variables used in the code generated for a region of HOTCODE and/or ABC. If this code is executed again, the program variables used by the code are checked by the analysis process 26 to ensure that they still have the properties required by the code to be executed; if a variable has changed so that it no longer has the required properties, the HOTCODE and/or ABC is not executed, and the region is instead recompiled or is executed by the conventional interpreter 28 executing the interpreter byte-codes. That is, system 10 "adapts" to changing properties of program variables by regenerating HOTCODE and/or ABC or falling back to the slower general-purpose interpreter 28.

The consequence of executing HOTCODE or ABC is to change the values of variables, some in the AWS 38 and some in the WS 36. Upon completion of each such execution, changed values in the AWS 38 need be placed back in the WS 36 restoring the state as though it had been achieved by execution of the CI 28 alone. We refer to this as marshaling-out. Any SAFE value that was not changed will still have the special NEVER TOUCHED and therefore may not be and need not be written back to the WS 36.

Figure 2:
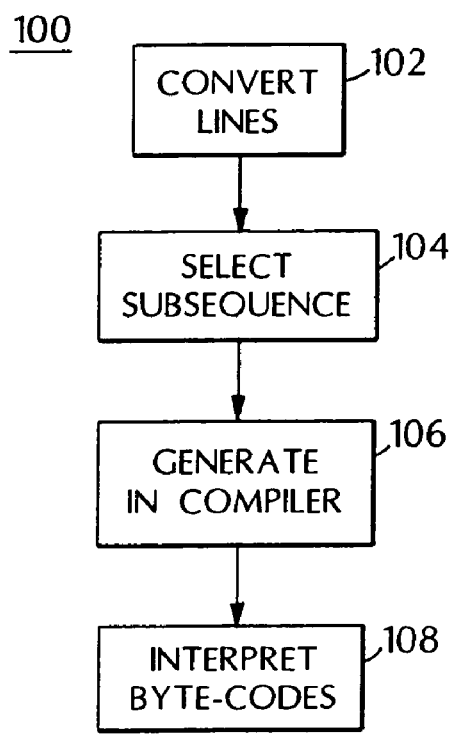
FIG. 2 is a flow diagram.

Referring to FIG. 2, a process 100 includes converting (102) source code representing functions to byte-codes representing functions. The process 100 selects (104) a subsequence of the byte-codes based on the byte-codes and the dynamic run-time properties of program variables. The properties include variable type and variable shape.

Selecting (104) includes analyzing the type and shape of the variables referenced by the byte-codes and determining whether the type and shape is modified. Byte-codes are added to the subsequence if the type and shape is not modified.

The process 100 generates (106) processor instructions in a compiler for the subsequence and interprets (108) byte-codes not contained in the subsequence.

Figure 3:
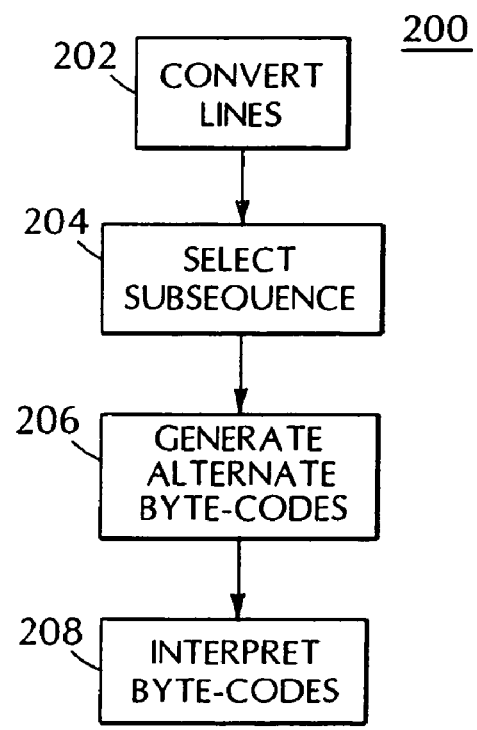
FIG. 3 is a flow diagram.

Referring to FIG. 3, a process 200 include converting (202) lines of source code representing functions to byte-codes representing functions. The process 200 selects (204) a subsequence of the byte-codes based on the byte-codes and the dynamic run-time properties of program variables. Selecting (204) includes determining the type and shape of variables referenced by byte-codes and resolving dynamic variable and constant value references to an absolute memory address. The process 200 generates (206) alternate byte-codes in an accelerated interpreter for the subsequence and interprets (208) the byte-codes not contained in the subsequence.

A number of embodiments of the invention have been described. Nevertheless, it will be understood that various modifications may be made without departing from the spirit and scope of the invention. For example, a combined technique of using the interpreter 28, the fast interpreter 32 and compiler 34 can be utilized. A technique of generating alternate byte-codes directly from source code can be utilized. A technique of executing the byte-code compiler 22, the analysis unit 26, the conventional interpreter 28, and/or the accelerator 30 on separate processors may also be utilized. A technique of implementing the fast interpreter 32 as a second attached processor may also be utilized. Accordingly, other embodiments are within the scope of the following claims.

What is claimed is:

1. A computer implemented method comprising steps of:
converting lines of source code representing functions to byte-codes representing functions;
  selecting a subsequence of byte-codes based on the byte-codes and dynamic run-time properties of variables referenced by the byte-codes;
  generating processor instructions in a compiler for the subsequence; and
  generating alternate byte-codes in an accelerated interpreter for at least a portion of the byte-codes not contained in the subsequence.

2. The method of claim 1 in which the properties comprise at least one of variable type or variable shape.

3. The method of claim 2 in which selecting comprises:
  analyzing the type and shape of the variables referenced by the byte-codes; and
  determining whether at least one of the type or shape is modified.

4. The method of claim 3 in which selecting further comprises:
  adding the byte-codes to the subsequence if the type and shape is not modified.

5. The method of claim 4 in which the subsequence represents a compilation unit.

6. The method of claim 1 further comprising executing the processor instructions in a processor.

7. The method of claim 1 further comprising:
  reverting a compilation unit to interpreted byte-codes; and
  removing the byte-codes in the subsequence of lines in which the type or shape of variables has changed.

8. A computer implemented method comprising steps of:
  converting lines of source code representing functions to byte-codes representing functions;
  selecting a subsequence of byte-codes based on the byte-codes and dynamic run-time properties of variables referenced by the byte-codes;
  generating processor instructions in a compiler for the subsequence;
  interpreting the byte-codes not contained in the subsequence;
  reverting a compilation unit to interpreted byte-codes; and
  determining whether the byte-codes that are members of the subsequence can remain in the subsequence.

9. The method of claim 8 in which determining comprises:
  analyzing an original type and shape of a variable; and
  determining whether a new type and a new shape of variable can be represented by the original type and original shape of variable.

10. The method of claim 8 in which determining comprises:
  analyzing an original type and shape of a variable; and
  determining whether the byte-codes can be compiled to processor instructions that can process both the original type and shape of the variable and the modified type and shape of the variable.

11. A computer implemented method comprising steps of:
  converting lines of source code representing functions to byte-codes representing functions;
  selecting a subsequence of byte-codes based on the byte-codes and dynamic run-time properties of variables referenced by the byte-codes;
  generating alternate byte-codes in an accelerated interpreter for the subsequence; and
  interpreting the byte-codes not contained in the subsequence by a second interpreter.

12. The method of claim 11 in which selecting comprises:
  determining type and shape of variables referenced by the byte-codes; and
  resolving dynamic variable and constant value references to an absolute memory address.

13. The method of claim 12 in which resolving comprises determining:
  whether an expression requires one or more temporary results; and
  storing the temporary results in memory locations that are determined at compile time.

14. The method of claim 12 in which resolving comprises:
  using a composition of an expression to group operations of an element-wise expression into a single compound operation.

15. A computer implemented method comprising steps of:
  converting source code representing functions to byte-codes representing functions;
  selecting a first subsequence of byte-codes based on the byte-codes and dynamic run-time state of program variables;
  selecting a second subsequence of byte-codes based on the byte-codes and the dynamic run-time state of program variables;
  generating processor instructions in a compiler for the first subsequence;
  generating alternate byte-codes in an accelerated interpreter for the second subsequence; and
  interpreting the byte-codes not contained in the first subsequence and the second subsequence.

16. The method of claim 15 in which selecting the first subsequence comprises:
   analyzing type and shape of the variables referenced by the byte-codes;
   determining whether the type and shape is modified; and
   adding the byte-codes to the subsequence if the type and shape is not modified.

17. The method of claim 15 in which selecting the second subsequence comprises:
   determining the type and shape of variables referenced by the byte-codes; and
   resolving dynamic variable and constant value references to an absolute memory address.

18. The method of claim 15 in which selecting the second subsequence comprises:
   using a structure of an expression to group operations of an element-wise expression into a single compound operation.

19. A computer implemented system comprising steps of:
   a first interpreter in a memory for converting source code into bytes-codes representing functions;
   an analysis unit in the memory for analyzing whether the byte-codes can be stored in a subsequence of byte-codes;
   a compiler for compiling byte-codes in the subsequence to processor instructions; and
   a second compiler for converting byte-codes not resident in the subsequence to alternate byte-codes.

20. The system of claim 19 further comprising a second interpreter for executing the alternate byte-codes.

21. The system of claim 19 further comprising a processor for executing the processor instructions.

22. The system of claim 21 further comprising an input/output device for receiving the source code and displaying results after execution of the processor instructions.

23. The system of claim 19, wherein the first interpreter, the compiler, or the second compiler executes on a first processor or a second processor.

24. An article comprising:
   a storage medium having stored thereon instructions that when executed by a machine results in the following:
   converting lines of source code representing functions to byte-codes representing functions;
   selecting a subsequence of byte-codes based on the byte-codes and dynamic run-time properties of variables referenced by the byte-codes;
   generating processor instructions in a compiler for the subsequence; and
   generating alternate byte-codes in an accelerated interpreter for at least a portion of the byte-codes not contained in the subsequence.

25. An article comprising a storage medium having stored thereon instructions that when executed by a machine results in the following:
   converting source code representing functions to byte-codes representing functions;
   selecting a first subsequence of byte-codes based on the byte-codes and the dynamic run-time state of program variables;
   selecting a second subsequence of byte-codes based on the byte-codes and dynamic run-time state of program variables;
   generating processor instructions in a compiler for the first subsequence;
   generating alternate byte-codes in an accelerated interpreter for the second subsequence; and
   interpreting the byte-codes not contained in the first subsequence and the second subsequence.

* * * * *